United States Patent [19]

Messenger

[11] Patent Number: 5,276,680
[45] Date of Patent: Jan. 4, 1994

[54] WIRELESS COUPLING OF DEVICES TO WIRED NETWORK

[75] Inventor: Steven Messenger, Scarborough, Canada

[73] Assignee: Telesystems SLW Inc., Ontario, Canada

[21] Appl. No.: 694,401

[22] Filed: May 1, 1991

[51] Int. Cl.[5] .................. H04L 12/28; H04B 7/26
[52] U.S. Cl. .................. 370/85.1; 370/95.1;
 455/33.2; 455/54.1; 455/54.2; 455/56.1;
 455/38.3; 379/58; 379/60; 379/63
[58] Field of Search .............. 370/85.1, 85.7, 85.8,
 370/94.1, 94.2, 95.1, 95.2, 95.3, 85.15, 16, 13;
 455/32.1, 33.1, 33.2, 34.1, 34.2, 38.3, 53.1, 54.1,
 56.1; 340/825.08, 825.54, 825.06, 825.07;
 379/58, 59, 60, 63; 371/11.1, 11.2, 8.2, 8.1

[56] References Cited

U.S. PATENT DOCUMENTS

| | | | |
|---|---|---|---|
| 4,665,519 | 5/1987 | Kirchner et al. | 370/95.3 |
| 4,792,946 | 12/1988 | Mayo | 370/85.15 |
| 5,095,531 | 3/1992 | Ito | 455/56.1 |

FOREIGN PATENT DOCUMENTS

| | | |
|---|---|---|
| 0221708 | 5/1987 | European Pat. Off. . |
| 0268375 | 5/1988 | European Pat. Off. . |
| 0366342 | 5/1990 | European Pat. Off. . |
| 0405074 | 1/1991 | European Pat. Off. . |

Primary Examiner—Wellington Chin
Attorney, Agent, or Firm—Mirek A. Waraksa

[57] ABSTRACT

Spaced-apart communication controllers connected to a cable-based network place a portable device in communication with the network for transfer of data packets. Each controller communicates with the portable device with packet transmissions through air, and requires registration of the portable device before offering packet transferring services. The registration process involves transmitting a packet from the portable unit requesting a response from controllers, transmitting a response packet from each controller receiving the request, selecting one of the responding controllers at the portable unit according to criteria that enhance data transfer, and transmitting from the portable unit a packet identifying the selected controller to complete registration. The selected controller transmits to other controllers via the network cable a packet confirming the registration. A controller with which the portable device was previously registered responds by de-registering the device and transmitting any stored packets addressed to the device via the cable to the newly selected controller. A power saving protocol is implemented for a battery-operated portable device and adjusted continually to accommodate the rate at which transmissions to the device occur. The power saving arrangement includes disabling the receiving section of the device.

14 Claims, 2 Drawing Sheets

WIRELESS COUPLING OF DEVICES TO WIRED NETWORK

FIELD OF THE INVENTION

The invention relates to networks for transmitting data in packet form, and more specifically, to methods and apparatus for wireless coupling of devices to a network in which cables are otherwise used to transfer data between network devices.

BACKGROUND OF THE INVENTION

Networks are known in which the primary transmission medium is a cable characterized by relatively high-transmission rates. Network nodes connected directly to the cable medium may typically consist of shared network resources, such as host computers, mass storage media, and communications ports. To better control data flow and allow a greater number of network users, the network may be configured as several local area networks (LAN's). Each LAN will comprise a limited number of devices that communicate directly with one another over local cables. The LAN devices may be coupled to the primary cable medium by a communication controller which is normally a router or a bridge. Although a router and a bridge operate in different ways, both ultimately enable data to be transferred between a device in a particular LAN and a device connected directly to the primary cable medium or located in another LAN.

The operation of a conventional router is well known. It will typically create and maintain a table of LAN's within the network. It is effectively unaware of the devices in the LAN it serves or in other LAN's. A device within its LAN may transmit, for example on start-up, a local packet requesting identification of a router and the router will transmit a packet identifying its address for communication. If the devices wishes to communicate with a device in another LAN, the device may transmit a packet to the router a packet containing relevant LAN and device addresses and any data required to be transmitted. The router then places the packet on the primary cable medium. A similar router serving the LAN in which the other device is located will retrieve the packet from the primary cable medium in response to the contained LAN address and transfer the packet to its LAN where the other device can receive the packet.

A conventional bridge monitors transmission of packets within individual LAN's, extracts device addresses from the packets, and builds a table of such addresses. Unlike a router, it is effectively aware of the network devices located in individual LAN's. If a particular device in a LAN served by the bridge transmits a packet addressed to a device in another LAN, the bridge relies on its table to convey the packet from the source device toward the destination LAN and ultimately the addressed device. The bridge will similarly recognize a packet addressed to the particular device and conveyed in the primary cable medium and transfer the packet to the LAN in which the device is located. The process of recognizing a device and providing packet transferring services to the device is referred to herein as "registration." A device receiving such packet transferring services is referred to herein as being "registered" with such packet transferring apparatus. The registration process associated with a conventional bridge is entirely "transparent" to the network. Although a device must be registered with the bridge to receive packet transferring services, a network device never addresses the bridge nor seeks to determine the presence of a bridge before attempting to transmit packets to a device in another LAN.

It is sometimes desirable to couple a portable device to such a network without requiring wiring to a router or to the primary cable medium. For example, it might be advantageous to permit a personal computer or terminal to be operated anywhere in an office complex to access data from a mainframe computer. In an automated system for identifying grocery prices, a battery-operated hand-held unit might be used to scan bar-codes identifying a particular product on display shelves. The scanned data can then be transmitted to a central computer that returns the price currently recorded and applied to purchase of the product at cash registers, for comparison with displayed prices. A battery-operated hand-held unit may also be used during physical inspection of inventories, allowing an individual to identify types and quantities of products and to transmit such data to a central computer that updates inventory records.

Present practices respecting coupling of portable devices generally involve multiple spaced-apart transceivers. Broadcasting regulations often restrict the transmission power of any single source. General concern regarding possible harmful effects of excessive electromagnetic radiation may itself necessitate limited transmission power. Transceiving devices may consequently be connected to the primary cable medium of the network at various spaced-apart locations, each serving portable devices in a particular limited area. Repeaters may be used to relay packets through air where direct connection of a transceiver to the primary cable medium is inconvenient. The various areas served by the transceiving devices and repeaters will be overlapped to ensure continuous communication with mobile devices throughout an office or industrial complex.

Several shortcoming exist in such conventional practices. When a packet addressed to a particular portable device is transmitted along the cable medium, each transceiving device of the network transmits the packet through air, regardless whether the portable device is within its area. If two or more transceiving devices detect a packet from a portable unit, each causes a separate copy of the packet to be conveyed along the primary cable medium. Conventional packet handling routines provide methods for eliminating duplicate packets. However, such routines require some processing time, and multiplication of packets, particularly in a large network, can have deleterious effects on the overall rate at which data is transmitted throughout the network. The problem is aggravated by conventional error checking practices that result in re-transmission of packets from an original source when transmission errors arise. Radio transmission of packets is generally subject to higher error rates than conventional transmission over cables.

Another shortcoming in conventional practices relates to operation of battery-powered portable units. Transmission or receipt of packets can place considerable current demand on a small battery and can severely shortens its useful life. It is now common to shut off the transmitter of a battery-powered unit between its transmissions. The receiver must, however, remain operative as conventional network practice assumes that a device will be continuously "listening" for packets addressed to it. With typical current drain of several hundred milliamperes, two standard AA batteries might be expected to have a life in the order of minutes. One proposed arrangement is to discontinue all network communications with a battery-operated device until certain keys associated with the device are operated. That may be effective where the device initiates all communications between itself and other network devices, but it is not a realistic solution for a large-scale network where multiple devices in remote LAN's may wish at any time to transmit packets to the portable device.

The present invention in its different aspects provides novel communication controllers and novel methods of placing portable devices in communication with networks and addresses various shortcomings associated with prior practices.

SUMMARY OF THE INVENTION

In one aspect, the invention provides a method of placing and maintaining a portable unit in wireless communication with the cable medium of a network for transfer of data packets via the cable medium to and from the portable unit. The method involves use of a plurality of communication controllers coupled to the cable medium for transfer of packets and also adapted to transmit and receive packets through air. Each communication controller requires registration of the portable unit before transferring packets between the portable unit and the cable medium. The portable unit is registered with one of the communication controllers with a registration process comprising transmitting through air from the portable unit a packet requesting a response from communication controllers. Each controller receiving the packet responds by transmitting through air (optionally in response to one or more criteria such as capacity to accommodate the portable unit) a response packet identifying the controller and indicating that the controller may register the portable unit. The portable unit responds to receipt of one or more response packets by selecting one of the responding controllers and transmitting through air from the portable unit a selection packet indicating the selected controller. The selected controller responds to receipt of the selection packet and optionally in response to one or more criteria (such as then current capacity to accommodate the portable unit) by registering the portable unit. Packet transmissions between the portable unit and the selected controller are thereafter monitored at the portable unit to detect transmission faults, and the registration process is re-initiated at the portable unit. Transmission faults may include a series of lost packets (detected when a controller fails to acknowledge transmitted packets), repeated errors in received packets detected by conventional error checking routines, poor signal strength, or an excessively low signal-to-noise ratio. According to this arrangement, a portable unit selectively registers with a controller to receive packet transferring services thereby avoiding the need to simultaneously transmit or detect packets at several transceiving devices.

To reduce the incidence of duplicate packets, any controller with which the portable unit is registered preferably detects conditions indicating that further transfer of packets between the portable unit and controller is not required and then de-registers the portable unit. Such a condition may be as simple as expiry of an arbitrary predetermined period of time without receipt of a packet through air from the portable unit. This criterion may be met, for example, when the portable unit leaves the LAN served by the controller or shuts off. An additional or alternative condition may involve receipt via the cable medium of a packet indicating that the portable unit has registered with another of the controllers. The controller may then de-register portable unit, effectively ceasing any further transmission of packets addressed to the portable unit and received via the cable medium from other network devices.

In another aspect, in a network of the general type described above, the invention provides a method of reducing packet loss during registration of a portable unit with a second network communication controller in response to packet transmission faults between the portable unit and a first network communication controller with which it had been registered. The method comprises storing packets addressed to the portable unit and received by the first controller in a buffer of the controller. A registration-indicating packet is transmitted from the second controller via the cable medium upon registration of the portable unit with second controller. In response to receipt of the registration-indicating packet, the first controller transmits via the cable medium any undelivered packets addressed to the portable unit and stored in its buffer. The transmitted packets are then received and stored by the second controller in a buffer for re-transmission to the portable unit.

In another aspect, the invention reduces power requirements for operation of a battery-powered hand-held unit coupled by a wireless link to a communication controller associated with a network and coupled to a cable medium associated with a network for packet transfers to and from the network. Specifically, battery current that might be required to continuously operate a receiving block to detect packets is reduced. The method comprises storing packets received by the communication controller and addressed to the portable unit in a buffer prior to transmission to the portable unit. Polling packets are transmitted at intervals through air from the portable unit. The term "polling packet" as used in this specification indicates a packet that causes a transmitted response from a device receiving the packet. Delivery of battery current required to operate the receiving block is enabled for a predetermined period of time following transmission of each polling packet and otherwise disabled between transmission of polling packets in such a manner as to reduce battery current demands. Stored packets addressed to the portable unit are transmitted through air from the controller only in response to receipt of polling packets from the portable unit and only within a preselected period of time following receipt of each polling packet. The preselected period corresponds substantially to the predetermined period during which delivery of the required current to the packet-receiving block is enabled.

The invention also involves apparatus for use in implementing the methods described above. Such apparatus and other aspects of the invention will be apparent from a description below of a preferred embodiment. Various aspects of the invention are more specifically defined in the appended claims.

DESCRIPTION OF THE DRAWINGS

The invention will be better understood with reference to drawings in which.

DESCRIPTION OF PREFERRED EMBODIMENTS

Figure 1:
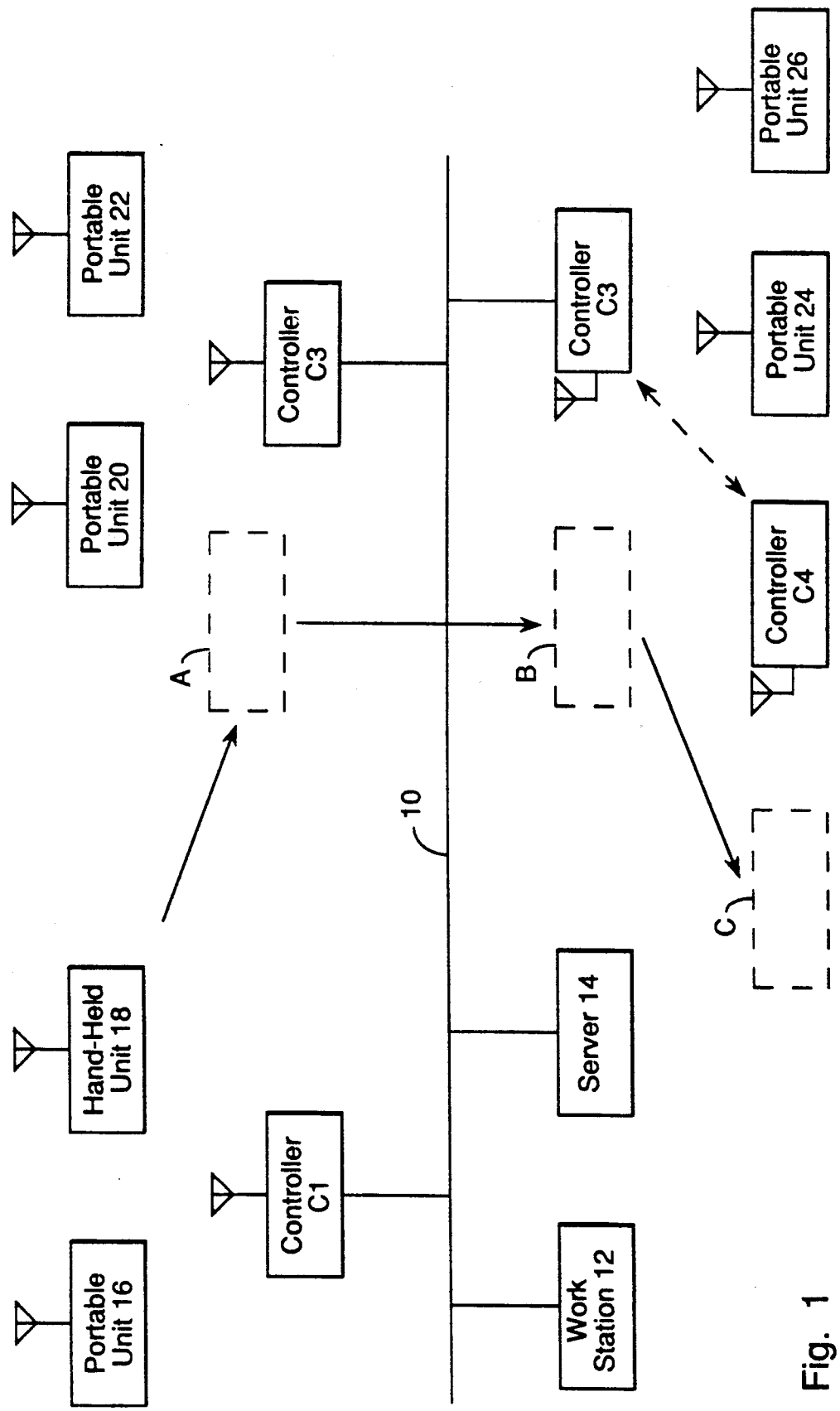
FIG. 1 is schematically illustrates a network comprising portable units coupled to a cable medium by radio links for transmission of data in packet form.

Reference is made to FIG. 1 which illustrates a network embodying the invention. The network comprises a cable medium, namely, an ethernet TM cable 10, along which all network data packets are transmitted when conveyed between any two network nodes. The principal nodes are direct-wired to the cable 10. These include a work station 12 and a network server 14, but may include a mainframe computer, communication channels, shared printers and various mass storage. These also include communication controllers C1, C2, C3. A fourth communication controller C4 effectively operates as a repeater, coupled to the cable 10 by the controller C3 and a radio link with the controller C3. It has been termed a "communication controller" because it registers portable units in the same manner as the communication controllers direct-wired to the cable 10 and offers the same basic registration services to the portable units. The controller C4 and each device to which it offers packet transferring services will, however, be registered with the controller C3 to ensure that packets intended for or transmitted by devices associated with the controller C4 are properly directed through the controller C4.

Several LAN's are present in the network illustrated. These LAN's are not specifically indicated, but each is effectively defined by the area which a single controller can serve, given limited transmission power, and the devices within that area. One LAN is served by the controller C1 and currently contains a portable unit 16, such as a line-powered personal computer, and a battery-powered hand-held unit 18. A second LAN is served by another controller C2 and currently contains two portable units 20, 22. A third LAN is served by the other wired controller C3 and also contains two portable units 24, 26. A fourth LAN is served by the controller C4, and no network device is currently within the range of that controller. The cable 10 and its nodes are also treated effectively as a LAN. It should be noted that all transmission between devices in different LAN's is via the cable 10. Only transmissions between devices in a single LAN avoid using the cable 10, but such matters are not discussed extensively herein.

Figure 3:
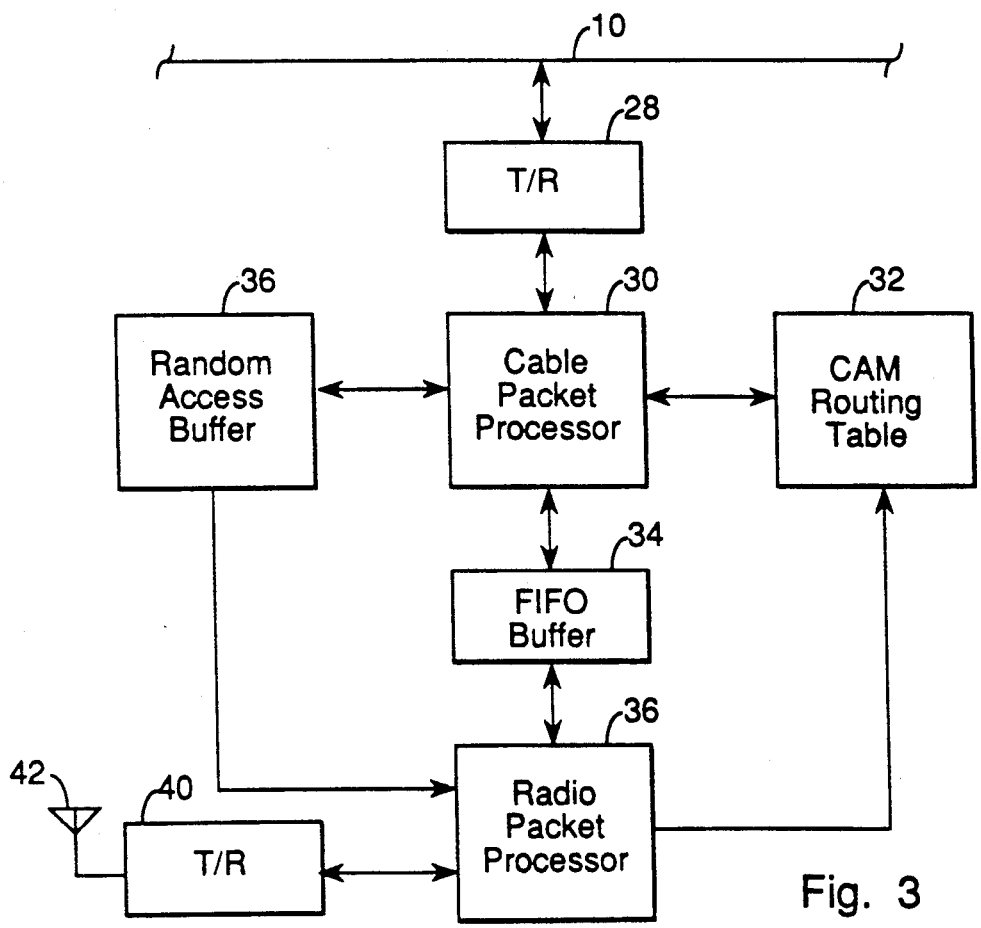
FIG. 3 is schematically illustrates the principal components of a network controller adapted to communicate with the portable unit.

The configuration of the controller C1 which is typical is shown in FIG. 3. It comprises a conventional transmitting/receiving block 28 that transfers packets to and from the cable 10. A packet processor 30 handles the packets received from the cable 10. A received packet will normally contain an address identifying an network node (device address). The cable packet processor 30 searches through a routing table constituted by a context addressable memory 32 (CAM) to locate an entry containing the address. That routing table contains network addresses only of the LAN members currently registered with the controller C1. If the address contained in the received packet is not found, the packet is simply discarded. Otherwise, the cable packet processor 30 retrieves additional information from the CAM 32 regarding the LAN member to which the packet is addressed. A CAM is preferred for such purposes because of the speed of information retrieval achieved. Alternatively, a more conventional arrangement information retrieval system can be implemented with multiple registers with sequentially addresses, each register containing information for a particular LAN device and an appropriate register address being assigned and located, for example, by adding a constant offset to the network address of the device. The alternative arrangement has the disadvantage that a large number of registers may be required.

The additional information retrieved from the CAM 32 for a particular LAN device will identify whether the addressed device is battery-powered and requires a power-saving protocol. It will also identify whether the device is mobile and whether packets addressed to the device should receive special treatment to accommodate movement. If the information indicates that no special treatment of the LAN device is required, the cable packet processor 30 simply stores the packet in a conventional first-in, first-out (FIFO) buffer 34. A radio packet processor 36 normally assembles packets from the FIFO buffer 34 into a form appropriate for transmission to LAN devices. It causes these packets to be transmitted by a transceiver 40 and associated antenna 42 in the order in which the packets were originally received.

If retrieved information indicates that power saving or accommodation of movement is required, the cable packet processor 30 stores the packet in a random access buffer 38. All such packets addressed to a particular LAN device are stored as a linked list in order of receipt. A pointer to the first packet in the list is stored in the routing table along with the other data respecting the LAN device. Packets intended for any particular device can consequently be located quickly in the random access buffer 38. The FIFO buffer 34 in contradistinction is simply maintained as a list of packets in order of receipt without regard to the intended recipient of the packet. The manner in which packets stored in the random access buffer 38 are ultimately transmitted to LAN devices will be discussed further below.

The radio packet processor 36 stores packets received from LAN devices in the FIFO buffer 34 unless the packet is intended for another portable LAN member. In the latter case, the packet will be stored by the radio packet processor 36 in the RAM buffer. The cable packet processor 30 retrieves packets addressed to devices external to the associated LAN periodically from the FIFO buffer 34 and conveys them along the cable 10. Devices at principal nodes of the network are adapted to handle such packets directly, in a conventional manner, if addressed to such devices. The other network communication controllers process such packets in substantially the manner described above and direct them to their respective LAN members if appropriately addressed.

Packets received from LAN members observing power saving protocols will generally contain a bit indicating the nature of the LAN member. The radio packet processor 36 responds to the packet and implements power saving routine. This will be discussed in greater detail below, following a description of the operation of the battery-operated hand-held unit 18.

Figure 2:
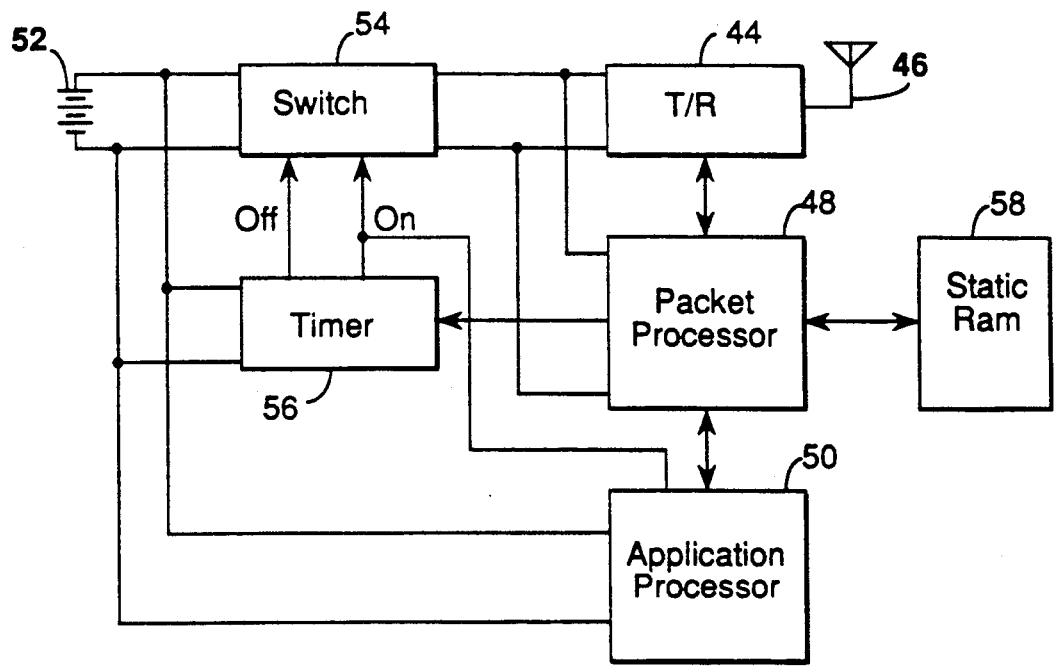
FIG. 2 is schematically illustrates the principal components of a hand-held portable unit.

The hand-held unit 18 is diagrammatically illustrated in FIG. 2. A transmitting/receiving block 44 with associated antenna 46 transmits and receives packets. A packet processor 48 assembles packets from data received from an application processor 50 for transmission. The packet processor 48 also processes packets received by the transmitting/receiving block 44, transferring received data to the application processor 50. The packet processor 48 performs conventional functions such as discarding packets not address to the hand-held unit 18, error checking, and the like. The application processor 50 performs whatever general or specialized functions the hand-held unit 18 is intended to perform, which may, for example, be directed to the inventory or price checking discussed earlier. As long as standard packet protocols are observed, the application processor 50 operates entirely independent of the packet processor 48.

The hand-held unit 18 is powered with a battery 52. Battery current is delivered to both the packet processor 48 and the transmitting/receiving block 44 through a switch 54. A controllable timer 56 is adapted to apply control signals to the switch 54 to place the switch 54 in either ON or OFF states, respectively enabling or disabling flow of battery current to both the packet processor 48 and transmitting/receiving block 44. The application processor 50 is adapted to apply a signal to trigger the switch 54 to its ON state at any time that data is to be transmitted (overriding the power saving protocol otherwise implemented). The packet processor 48 controls the switch 54 indirectly through the timer 56 to place the switch 54 in its OFF state, and simultaneously initiates counting by the timer 56 through a period of time specified by the packet processor 48. The timer 56 is configured to trip the switch 54 to its ON state once the period of time has expired thereby enabling flow of battery current once again to the processor 48 and the transmitting/receiving block 44. Static random access memory (RAM) 58 permits the packet processor 48 to store various parameters while power is disabled.

Packet transmission to and from the hand-held unit 18 is regulated by a polling process in which the hand-held unit 18 is dominant and a controller is subservient. This will be discussed with reference to the controller C1. The packet processor 48 of the hand-held unit 18 causes a polling packet to be transmitted to the controller C1. The polling packet may itself contain data received from the application processor 50 and intended for delivery to another network node. The polling packet may alternatively be an empty packet effectively querying the controller C1 for transmission of any packets addressed to the hand-held unit 18 and stored in the controller's random access buffer 38. Following transmission of the polling packet, the packet processor 48 remains active until a response packet is received from the controller C1 or expiry of a period of roughly 10 milliseconds. The packet processor 48 then initiates operation of the counter, specifying the counting period, which may for example be 200 milliseconds (exemplary and variable), and effectively trips the switch 54 to its OFF state. This disables battery current to both the packet processor 48 and the transmitting/receiving block 44. When the timer 56 completes counting through the set period of 200 milliseconds, it trips the switch 54 to its ON state, once again enabling the packet processor 48 and the transmitting/receiving block 44. The packet processor 48 immediately causes transmission of a polling packet. This basic process is repeated (subject to adjustment of polling rates described below), allowing both communication with the hand-held unit 18 and power saving.

The radio packet processor 36 of the controller C1 responds to each polling packet (flagged with an appropriate control bit to indicate a power saving requirement) from the hand-held unit 18 essentially as follows. It scans the table maintained in the CAM 32 for the entry containing the network address of the hand-held unit 18. That source address is of course contained in each polling packet following conventional packet transmission protocols. It checks the field of the entry that contains the pointer to the linked list of packets stored in the random access buffer 38 and addressed to the hand-held unit 18. If a null pointer is present, indicating no pending packets, the radio packet processor 36 causes an empty response packet to be transmitted to the hand-held unit 18, acknowledging receipt of the polling packet. Otherwise, it locates the first packet addressed to the hand-held unit 18 from the random access buffer 38, causes the packet to be transmitted to the hand-held unit 18, and updates the pointer stored in the CAM 32 to identify the next in the list of relevant packets or to indicate a null pointer. The retrieval and transmission process is completed within the exemplary 10 millisecond period during which the packet processor 48 of the hand-held unit 18 and its transmitting/receiving block 44 remain enabled.

The power saving protocol is preferably modified to accommodate the rate of data transmission to the hand-held unit 18. This is done specifically by varying the polling rate and the period of time during which battery current flow is disabled, inversely related factors. The packet processor 48 of the hand-held unit 18 may be appropriately programmed to poll the controller C1 initially about 2 second intervals. The packet processor 48 effects such a polling rate by specifying a timer counting period of about 2 seconds. Each time a non-empty response packet is received by the hand-held unit 18 from the controller C1, the packet processor 48 roughly doubles the polling rate, effectively by dividing the counting period it specifies for the counter in half. This doubling of the polling rate may continue until the polling interval approaches the 10 millisecond time-out period in which a controller response must be received. Each time that an empty response packet is received from the controller C1, the polling rate may be divided in half by the packet processor 48 (by doubling the counting period specified for the timer 56) until the maximum polling period of 2 seconds is restored. Such operation effectively increases the polling rate in response to the rate at which the network transmits data to the hand-held unit 18. The hand-held unit 18 does not become a severe bottle-neck in the transmission stream. When the transmission rate is low, the polling rate is reduced, incidentally reducing requirements for battery current.

General operation of the network to accommodate movement of the hand-held unit 18 will be described. The hand-held unit 18 is assumed to be registered initially with the controller C1. The controller C1 is also assumed to have undelivered packets addressed to the hand-held unit 18 and stored in its random access buffer 38. The hand-held unit 18 is assumed then to move to position A, illustrated in phantom outline in FIG. 1, assumed to be beyond the transmission range of the controller C1. The hand-held unit 18 transmits polling packets at intervals, following its power-saving routine, with no response from the controller C1. After a predetermined number of attempts to poll the controller C1, the packet processor 48 of the hand-held unit 18 causes transmission of a packet requesting registration with a network communication controller and providing its unique network address or identification. That packet preferably contains a bit identifying it as a control packet to trigger appropriate processing by the radio packet processors of any controller. The packet may be stored in the FIFO buffers associated with each controller receiving the packet and in practice may simply be processed in the normal order associated with received packets. The registration-requesting packet is assumed in this instance to be received only by the controllers C2 and C3.

In this embodiment of the invention, the radio packet processor associated with each controller is adapted to register only a fixed number of devices in its LAN. The controllers C1 and C2 scan their respective routing tables to determine how many devices they have registered and whether the hand-held unit 18 can be accommodated. This is referred to as searching for an "empty registration slot." It is assumed that both controllers C2 and C3 can accommodate another device. Each then transmits a response packet addressed to the hand-held unit 18 and each reserves a registration slot for a predetermined period of time. Each response packet will include the controller's unique network address and will also indicate the number of hops from the controller to the cable 10. A controller connected directly to the cable 10 is regarded as 0 hops from the cable 10. A controller that functions as a repeater returns a positive number indicating the number of intervening controllers (hops) required to couple it to the cable 10.

The hand-held unit 18 then responds to the controller response packets by selecting one of the responding controllers C2, C3. The selection is made according to the number of hops to the cable 10, signal strength (detected in a conventional manner), and which response packet is first received, priority being assigned in that order. In the present case, governed by the second criterion, namely, signal strength, and assuming that the closer controller C2 produces a stronger received signal, the hand-held unit 18 selects the controller C2. The hand-held unit 18 then transmits a selection packet addressed to the controller C2 requesting registration. The selected controller C2 responds to the selection packet by registering the hand-held unit 18 and begins the process of monitoring the cable 10 for packets addressed to the hand-held unit 18. It also recognizes and conveys to the cable 10 any data packets received from the hand-held unit 18. The controller C3, not selected, but within range, does not respond to packets in the cable 10 addressed to the hand-held unit 18 and does not respond to any data packets received from the hand-held unit 18. No duplicate packets are produced within the cable 10 and no duplicate packets are transmitted through air.

Contemporaneously with registration, the selected controller C2 transmits via the cable 10 a multicast packet indicating its registration of the hand-held unit 18. The multicast packet contains a unique address to which all network controllers. This is conveyed via the cable 10 to the controller C1 with which the hand-held unit 18 had been registered. The controller C1 responds by immediately de-registering the hand-held unit 18, discontinuing monitoring of the cable 10 for packets addressed to the hand-held unit 18 and disregarding further packets of a general nature transmitted by the hand-held unit 18 and possibly received by the controller C1. The controller C1 also responds by transmitting along the cable 10 any undelivered packets contained in its random access buffer 38 that are addressed to the hand-held unit 18. The newly selected controller C2 retrieves the packets from the cable 10 and stores them in its random access buffer for re-transmission to the hand-held unit 18. Conventional network protocols provide a general mechanism for sorting packets, and in many instances, no special steps are required to ensure that the stored packets are transmitted and re-stored in a particular order. However, a preferred practice is to incorporate a sequencing field into each packet indicating the total number of packets being transferred and the particular order of the particular packet relative to the total number. Storage of the packets in the random access buffer of the controller C2 may than involve reconstructing a linked list of the packets in precisely the same order as originally maintained by the controller C2. The hand-held unit 18 polls the controller C2 in the manner described above to retrieve such packets.

The hand-held unit 18 may then move to position B shown in phantom in FIG. 1. It is assumed now to be out of range of the controller C2 but still within the range of controllers C3, C4. After predetermined attempts to contact the controller C2 with polling packets, the hand-held unit 18 sends a packet requesting registration with a communication controller. It receives response packets only from the controllers C3, C4. The packet from controller C4 will indicate that the controller C4 is one hop away from the cable 10, that is, the controller functions as a repeater. The packet from the controller C3 indicates direct connection to the cable 10 (zero hops). The hand-held unit 18 consequently selects the controller C3 according to the criteria specified above, and transmits a packet requesting registration with the controller C3. The controller C3 responds with response packet confirming registration, assuming no intervening registrations have taken the full capacity of the controller C3. If the capacity of the controller were somehow taken, the hand-held unit 18 would repeat transmission of its selection packet, assume transmission failure, and re-initiate the process of locating an appropriate communication controller. The controller C3 also transmits via the cable 10 a multicast packet addressed to controllers indicating the registration, and the controller C2 de-registers the hand-held unit 18. The controller C2 transmits any undelivered packets addressed to the hand-held unit 18 along the cable 10, and the new controller C3 detects and stores the packets. In effect, the controller C3 is fully conditioned to continue packet transmission from where the last controller lost communication with the hand-held unit 18. No packets are lost.

In position C illustrated in phantom in FIG. 1, the hand-held unit 18 is assumed to be out of range of all controllers except the controller C4. With repeated failure in transmission of packets to the controller C3, the hand-held unit 18 transmits a packet requesting registration with a controller. Only the controller C4 responds by transmitting an appropriate packet. The selection process at the hand-held unit 18 is simplified, the only criterion to be applied is that a controller responded and was effectively the first controller to respond. The hand-held unit 18 then transmits its selection packet identifying the controller C4 and requesting registration. The controller C4 registers the hand-held unit 18, and transmits a multicast packet via the cable 10 addressed to controllers confirming the registration. The controller C3 actually places the packet on the cable 10.

The controller C1-C4 effectively replace the prior art transceiving devices used to couple a portable device to a wired network. Their overall operation may to some extent be viewed as a hybrid of router and bridge operation with a particular registration protocol superimposed. Like a router, each will be addressed by the devices within its LAN. Unlike most conventional routers, the controllers C1-C4 do not maintain a table of LAN's within the network. The operating assumption is that a packet addressed to a particular device, if transmitted by a router "via" the cable 10 (that is, if the cable 10 forms part of the transmission path) will ultimately be detected by another controller with which the particular device is registered. Like a bridge, the controllers C1-C4 are effectively aware of the devices in their associated LAN (although not devices in other LAN's) and the devices in their associated LAN are registered with them before receiving packet transferring services. Unlike a conventional bridge, the controllers C1-C4 must be addressed and require involvement of a device in the registration process. That requirement avoids the tendency to produce duplicate packets and allows fast re-routing of packets as devices move throughout the LAN's.

A number of alternatives might be considered. The communication controllers may be programmed not to reserve a registration slot for a particular device transmitting a request for registration. If another device is registered in the meantime, taking a last empty registration slot, the selected controller may simply not respond to transmission and re-transmission of a selection packet from the particular device. The particular device will treat this as another transmission fault, and repeats the registration process, effectively seeking an alternative controller. Another alternative, which may practical for many small networks, is to operate on the assumption that each controller will be obliged to register no more than a fixed number of devices. Communication controllers for such applications may have CAM's or other memory units containing registration slots in excess of that fixed number and can be programmed always to offer registration to every device transmitting an appropriate selection packet. Specific details of implementation can be greatly varied. For example, the cable and radio packet processors associated with each controller may be constituted by a single processor performing dual functions. The FIFO buffer of each controller has been depicted as a single unit in which both packets received and to be transmitted (as to non-portable devices), but could be replaced by separate and distinct storage media.

It will be appreciated that a particular embodiment of the invention has been described and that further modifications may be made therein without departing from the spirit and principle of the invention or necessarily departing from the scope of the appended claims.

I claim:

1. In a network comprising a cable medium conveying packets between predetermined nodes, a portable unit capable of transmitting and receiving packets through air, and a plurality of communication controllers in a predetermined spaced-apart arrangement, each of the plurality of controllers being capable of transmitting and receiving packets through air within a limited area and being coupled to the cable medium for transfer of packets to and from the cable medium, each of the plurality of controllers requiring registration of the portable unit with the controller before transferring packets between the portable unit and the cable medium, a method of placing and maintaining the portable unit in wireless communication with the cable medium for transfer of packets via the cable medium to and from the portable unit, comprising:

registering the portable unit with one of the plurality of controllers with a registration process comprising:

(a) transmitting through air from the portable unit a packet requesting a response from each of the plurality of controllers;

(b) responding to the request for response at each of the controllers that receives the packet from the portable unit, the responding comprising transmitting through air a response packet identifying the controller and indicating that the controller may register the portable unit;

(c) responding at the portable unit to receipt of one or more controller response packets by selecting one of the responding controllers and transmitting through air from the portable unit a selection packet indicating the selected controller;

(d) responding at the selected controller to receipt of the selection packet by registering the portable unit with the selected controller;

(e) transmitting via the cable medium from the selected controller upon its registration of the portable unit a registration-indicating packet indicating that the selected controller has registered the portable unit;

(f) responding to receipt of the registration-indicating packet at another of the controllers with which the portable unit had been registered prior to registration with the selected controller by de-registering the portable unit from the other controller; and, monitoring transmission of packets between the portable unit and the selected controller at the portable unit after registration of the portable unit with the selected controller thereby to detect transmission faults and re-initiating the registration process at the portable unit in response to transmission faults.

2. The method of claim 1 in which each of the controllers is adapted to store packets addressed to the portable device and received by the controller prior to transmission of such packets by the controller through air to the portable unit, the method being adapted to recover any undelivered packets stored by the other controller with which the portable unit had been registered, the registration process further comprising:

responding to the registration-indicating packet at the other controller by transmitting the undelivered packets via the cable medium to the selected controller; and, receiving and storing the transmitted undelivered packets at the selected controller for transmission through air to the portable unit.

3. The method of claim 1 comprising detecting at any one of the controllers with which the portable unit is registered a predetermined condition indicating that further transfer of packets between the portable unit and controller is not required and de-registering the portable unit from the controller in response to detection of such a condition.

4. The method of claim 3 in which the predetermined condition at the any one of the controllers is one of (a) expiry of a predetermined period of time without receipt of a packet through air from the portable unit and (b) receipt via the cable medium of a packet indicating that the portable unit has registered with another of the controllers.

5. The method of claim 1 in which the portable unit is operated with a battery that delivers electric current required for operation of a packet-receiving block of the portable unit, the method further comprising:

storing packets received by the selected controller and addressed to the portable unit in a buffer associated with the selected controller;

transmitting at intervals through air from the portable unit a polling packet;

enabling delivery of the required electric current for a predetermined period of time following transmission of each polling packet from the portable unit and so disabling delivery of the required electric current between transmission of polling packets that current demands on the battery are reduced;

transmitting stored packets addressed to the portable unit through air from the selected controller only in response to receipt of polling packets from the portable unit and only within a preselected period of time following receipt of each polling packet from the portable unit, the preselected period corresponding substantially to the predetermined period during which delivery of the required current to the packet-receiving block is enabled; and, decreasing the interval between transmission of successive polling packets incrementally toward a predetermined lower limit in response to receipt at the portable unit of each stored packet addressed to the portable unit and transmitted through air by the selected controller.

6. The method of claim 5 further comprising:

transmitting a predetermined response packet addressed to the portable unit in response to each polling packet received by the selected controller from the portable unit in the event that the buffer of the selected controller contains no stored packet addressed to the portable unit; and, increasing the interval between transmission of successive polling packets incrementally toward a predetermined upper limit in response to receipt at the portable unit of each predetermined response packet addressed to and received by the portable unit.

7. In a network comprising a cable medium conveying packets between predetermined nodes, a portable unit capable of transmitting and receiving packets through air, and a plurality of communication controllers in a predetermined spaced-apart arrangement, each of the plurality of controllers being capable of transmitting and receiving packets through air within a predetermined area and being coupled to the cable medium for transfer of packets to and from the cable medium, the portable unit being operated with a battery that delivers electric current required for operation of a packet-receiving block of the portable unit, the portable unit being registered with one of the plurality of controllers during transfer of packets between the portable unit and the cable medium, a method of reducing current demands on the battery of the portable unit, comprising:

storing packets received by the one controller and addressed to the portable unit in a buffer associated with the one controller;

transmitting at intervals through air from the portable unit a polling packet;

enabling delivery of the required electric current for a predetermined period of time following transmission of each polling packet from the portable unit and so disabling delivery of the required electric current between transmission of polling packets that current demands on the battery are reduced;

transmitting stored packets addressed to the portable unit through air from the one controller only in response to receipt of polling packets from the portable unit and only within a preselected period of time following receipt of each polling packet from the portable unit, the preselected period corresponding substantially to the predetermined period during which delivery of the required current to the packet-receiving block is enabled; and, decreasing the interval between transmission of successive polling packets incrementally toward a predetermined lower limit in response to receipt at the portable unit of each stored packet addressed to the portable unit and transmitted through air by the selected controller.

8. The method of claim 7 further comprising:

transmitting a predetermined response packet addressed to the portable unit in response to each polling packet received by the selected controller from the portable unit in the event that the buffer of the selected controller contains no stored packet addressed to the portable unit; and, increasing the interval between transmission of successive polling packets incrementally toward a predetermined upper limit in response to receipt at the portable unit of each predetermined response packet addressed to and received by the portable unit.

9. The method of claim 7 adapted to recover undelivered packets addressed to the portable unit and stored in the buffer of the one controller in response to registration of the portable unit with another of the plurality of controllers, comprising:

transmitting from the other controller via the cable medium upon its registration of the portable unit a registration-indicating packet indicating that the other controller has registered the portable unit;

responding to the registration-indicating packet at the one controller by transmitting the undelivered packets via the cable medium to the other controller; and receiving the transmitted undelivered packets at the other controller and storing the undelivered packets in a buffer associated with the other controller for transmission to the portable unit.

10. In a network comprising a cable medium for conveying packets between predetermined nodes, a portable unit capable of transmitting and receiving packets through air, and a plurality of communication controllers in a predetermined spaced-apart arrangement, each of the plurality of controllers being capable of transmitting and receiving packets through air within a limited area and being coupled to the cable medium for transfer of packets to and from the cable medium, each of the plurality of controllers requiring registration of the portable unit with the controller before transferring packets between the portable unit and the cable medium, the portable unit being registered with one of the plurality of controllers, a method of reducing loss of packets during registration of the portable unit with another of the plurality of controllers in response to a transmission fault to or from one controller, comprising:

storing packets addressed to the portable unit and received by the one controller for transmission to the portable unit in a buffer of the one controller while the portable unit is registered with the one controller;

transmitting from the other controller via the cable medium upon registration of the portable unit with the other controller a registration-indicating packet indicating that the controller has registered the portable unit;

responding at the one controller to receipt of the registration-indicating packet by transmitting via the cable medium any undelivered packets addressed to the portable unit and stored in the buffer of the one controller; and, receiving the transmitted undelivered packets at the other controller and storing the undelivered packets in a random access buffer of the other controller for transmission through air to the portable unit.

11. The method of claim 10 further comprising de-registering the portable unit from the one controller in response to receipt of the registration-indicating packet.

12. A communication controller for placing a portable unit capable of transmitting and receiving packets through air in communication with a cable medium of a network for transfer of packets via the cable medium to and from the portable unit, comprising:

means for transmitting and receiving packets through air;

means for transferring packets to and from the cable medium;

a buffer;

control means for registering the portable unit with the controller in response to receipt of a packet transmitted through air by the portable unit and requesting registration of the portable unit with the controller, the control means being adapted to store packets received by the controller via the cable medium and addressed to the portable unit in the buffer for transmission to the portable unit upon registration of the portable unit with the controller;

the control means being adapted to respond to a packet received from another controller of the network and indicating registration of the portable unit with the other controller by transmitting any undelivered ones of the stored packets stored by the controller via the cable medium to the other controller.

13. The communication controller of claim 12 in which the controller means are adapted to de-registered the portable unit from the controller in response to receipt by the controller of the registration-indicating packet from the other controller.

14. The controller of claim 13 in which the control means are adapted to transmit via the cable medium upon registration of the portable unit with the controller a packet indicating registration of the portable unit with the controller thereby to initiate transmission of undelivered packets addressed to the portable unit and stored in any controller with which the portable unit was previously registered.

* * * * *